F. F. LONG.
HEATER.
APPLICATION FILED MAY 13, 1913.

1,108,919.

Patented Sept. 1, 1914.

2 SHEETS—SHEET 1.

Witnesses
Carroll Bailey
B. F. Garway Jr.

Inventor
Francis F. Long,
By Richard Cliver
his Attorney

F. F. LONG.
HEATER.
APPLICATION FILED MAY 13, 1913.
1,108,919.
Patented Sept. 1, 1914.
2 SHEETS—SHEET 2.
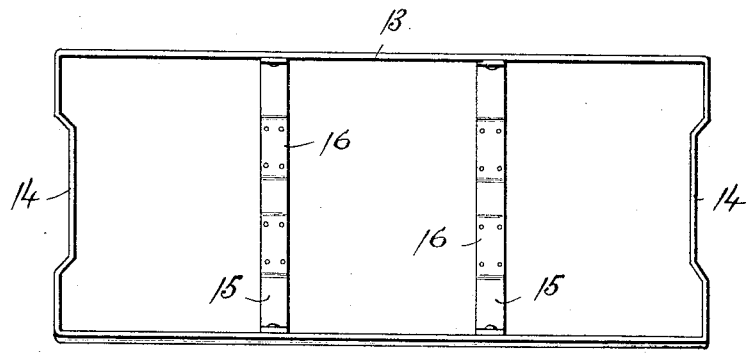
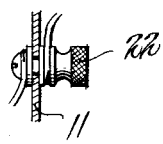
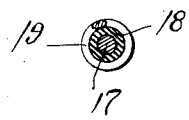
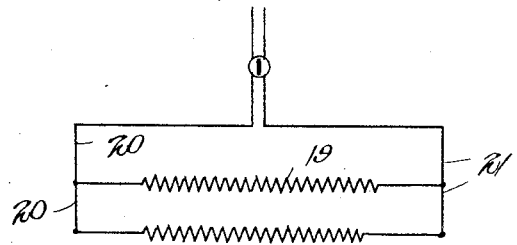
Witnesses
Inventor
Francis F. Long,
By
his Attorney

UNITED STATES PATENT OFFICE.

FRANCIS F. LONG, OF CAMPBELLFORD, ONTARIO, CANADA.

HEATER.

1,108,919.     Specification of Letters Patent.     Patented Sept. 1, 1914.

Application filed May 13, 1913. Serial No. 767,375.

*To all whom it may concern:*

Be it known that I, FRANCIS F. LONG, a subject of the King of Great Britain, residing at Campbellford, in the Province of Ontario and Dominion of Canada, have invented certain new and useful Improvements in Heaters, of which the following is a specification.

This invention relates to electric heaters and more particularly to a heating element which is disposed within a housing so as to project the radiant heat thereof forwardly and downwardly thus especially adapting the same for use in the making of confections or the like.

An object of this invention is the provision of a peculiarly formed housing which has a heating element carried on the interior thereof, the heating element being so arranged within the housing as to reflect the heat thereof forwardly and rearwardly by the peculiar formation of the rear wall of the housing thus obtaining a progressive heat which is particularly adapted for heating a confection batch to facilitate its manipulation, since the latter quickly hardens after having been removed from the heating agent as is well known to those skilled in this art.

Other objects as well as the nature, characteristic features and scope of my invention will be more readily understood from the following description taken in connection with the accompanying drawings and pointed out in the claims forming a part of this specification, wherein:—

Figure 1:
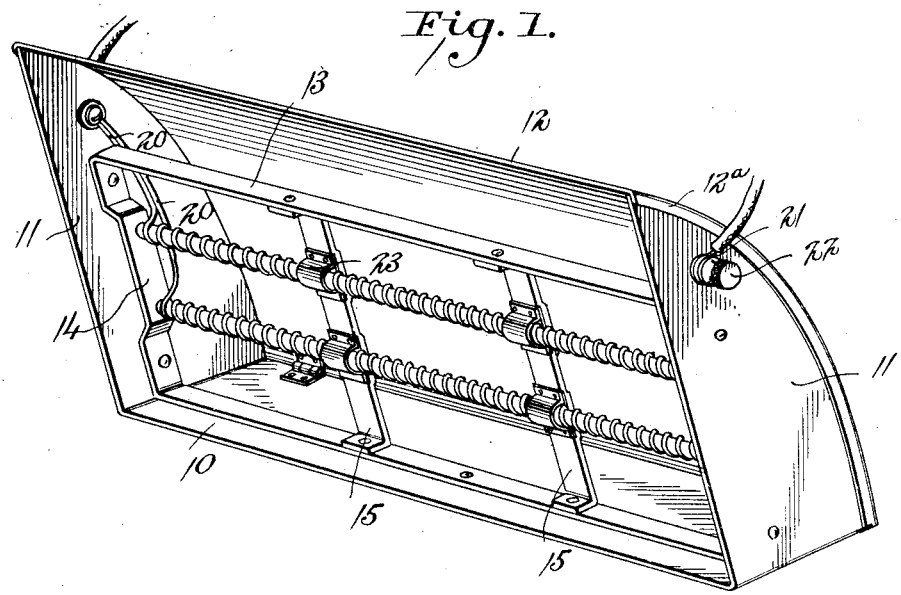
Figure 2:
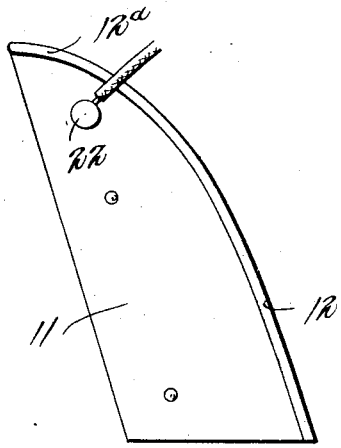
Figure 3:
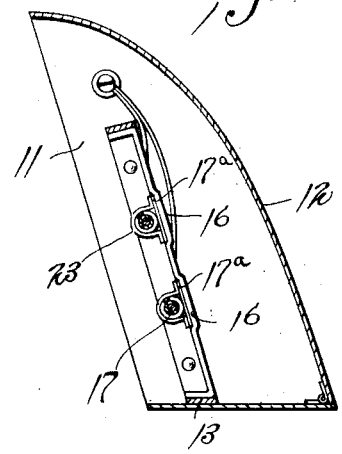

Figure 1 is a perspective view of the housing showing the heating element disposed therein; Fig. 2 is an end view of the same showing the one end of the electric circuit wires secured to the housing; Fig. 3 is a cross sectional view taken on the line *x—x* of Fig. 1; Fig. 4 is an enlarged detail plan view of the frame. Fig. 5 is an enlarged detail view of the binding post showing the manner in which the one end of the circuit wires are secured to the side wall; Fig. 6 is a detail enlarged view of the resistance element supporting rod showing the insulated sleeves thereof; and Fig. 7 is a detail diagrammatic view of the circuit.

In the drawings is shown a housing or shell which is made of any suitable heating reflecting material and has the base 10 thereof integrally formed with the side walls 11. The rear edges of the side walls are curved outwardly and downwardly so as to conform to the curvature of the rear wall 12. The rear wall 12 is hingedly mounted on the base 10 and has the side edges thereof bent inwardly as indicated at 12ª, at right angles to the body thereof and adapted for engagement against the exterior of the side walls 11. The said side walls and rear wall, are formed so as to project forwardly on the base as shown to advantage in Fig. 3.

Disposed within the housing or shell is a rectangular frame 13 which has the ends thereof depressed inwardly midway the ends thereof as indicated at 14 and shown to advantage in Fig. 1. Carried within the frame and between said depressed ends are a plurality of vertical supporting bars 15 which have the opposite ends thereof turned inwardly at right angles to the body thereof so as to form supporting feet to which they are secured through the medium of rivets or the like to the frame. The said supporting bars are arranged in spaced relation within the frame and are provided with depressed portions 16 which are shown to advantage in Fig. 3. A plurality of rods 17 are disposed within the frame, having the one end of each mounted in the depressed portion 14 of the frame 13 and the opposite end carried in the opposite depressed portion of the frame. Sleeved on each of the rods 17 is a suitable insulating material 18 and has encircled thereon a resistance coil 19. Positive and negative circuit wires 20 and 21 are secured to the side walls 11 of the housing by a suitable binding post 22 as shown to advantage in Fig. 5. It is obvious that the current is taken from an external source of supply and will be carried through the wires 20 and 21 within the housing so as to form a heating element which has heretofore been described. The rods 17 which have the opposite ends thereof carried in the depressed portions 14 of the frame 13, are further supported by loop-straps 23 which are secured to the vertical bars 15 within the depressed portion 16 of the frame. The said depressed portion 16 has an insulating strip 17ª carried therein so as to insulate the vertical supporting bars 15 from the resistance coil 19.

In reducing my improved device to practice a confectioner's table is used having my improved device placed on the end thereof so that the heat will be reflected forwardly and downwardly on the table and the heat utilized to warm the batch or confection which is on the table. As before stated power is conducted from an external source of supply through the circuit wires 20 and 21 within the housing 12, said circuit wires being coiled or encircled around the rods 17 as above stated thereby providing a heating element which will project therefrom its radiant heat thereby providing a certain desirable progressive heat which may be readily cut off by the breaking of the circuit through the medium of a switch as shown in the diagrammatic view in Fig. 7. The rear wall 12 is of a peculiar formation so as to reflect the heat forward and downward which is absolutely necessary in the provision of a device of this character. The projecting of the heat forwardly and downwardly is further facilitated by disposing the frame 13 at an angle within the housing or shell, thus disposing the heating element which is supported by the frame, also at an angle. The rear wall 12 is hingedly mounted on the base 10 so that access may be readily gained to the rear of the heating element when so desired for cleaning the same, etc., the hinging of said rear wall likewise permitting the heat to be projected both forwardly and rearwardly when so desired, so as to utilize the device as an ordinary heater for a room, should it be so desired.

It will be understood that the above description and accompanying drawings comprehend only the general and preferred embodiment of my invention and that various minor changes in details of construction, proportion and arrangement of the parts may be made within the scope of the appended claims and without sacrificing any of the advantages of my invention.

What is claimed is:—

1. A confectionery heater including heating elements, a housing inclosing said elements including a flat supporting base and a curved rear wall hingedly connected to said base adjacent one of the longitudinal edges thereof whereby access is gained to the rear of said heating elements, the opposite ends of said wall being turned at right-angles to the body for engagement with the sides of the casing for preventing the escapement of heat.

2. A heater including a frame, the ends of said frame being depressed, supporting rods, the opposite ends thereof being disposed in said depressed portions, vertical supporting bars arranged in said frame, loop-straps adapted to hold said rods to said bars, and a housing inclosing said frame, the rear wall thereof being curved so as to reflect the heat forwardly and downwardly.

3. A heater including a rectangular frame, the ends of said frame being depressed, supporting rods arranged in spaced relation in the frame, the opposite ends of said rods being disposed in said depressed portions, vertical supporting bars arranged in said frame, each of said bars being provided with a plurality of depressed portions, loop-straps adapted to hold said rods in said depressed portions of said bars, and a housing inclosing said frame the rear walls thereof being curved so as to reflect the heat forwardly and downwardly therefrom.

4. A confectionery heater including a housing, said housing comprising an integrally formed base and side walls, said side walls having the rear edges thereof curved rearwardly and downwardly, a rear wall hingedly mounted on said base, said rear wall conforming to the curvatures of said rear walls, flanges formed on the ends of said rear wall and adapted for engagement with said walls, a frame disposed within said housing, said frame having the opposed ends thereof provided with depressed portions, supporting rods extending longitudinally of said casing and having the ends thereof secured to said depressed portions, vertical supporting bars arranged within said frame and provided with depressed portions, a heating element coiled on said longitudinal supporting bars, loop straps carried by said vertical supporting bars in said depressed portions and adapted to hold said longitudinal rods into engagement with said vertical supporting bars, an insulated strip carried in each of said depressed portions of said vertical supporting bars, whereby to insulate said bars from said heating element.

5. A confectionery heater including a frame, the ends of said frame being depressed, supporting rods, the opposite ends thereof being disposed in said depressed portions, vertical supporting bars arranged in said frame, said bars being provided with depressed portions, a resistance coil encircling each of said rods, each of said rods adapted for engagement with said vertical bars, loop straps carried by each of said bars for holding said rods into engagement with said vertical bars, an insulating strip carried by each of said depressed portions in said vertical bars whereby to insulate said bar from said resistance coil, and a housing inclosing said frame, the rear wall thereof being curved so as to reflect the heat forwardly and downwardly therefrom.

6. An electric heater including a frame, supporting rods carried by said frame an insulating material sleeved on each of said rods, vertical supporting bars carried within said frame, said vertical bars being provided with depressed portions, a resistance coil encircling each of said insulated sleeves, loop straps carried by said vertical bars, for holding said rods into engagement therewith, an insulating strip disposed in each of said depressed portions adapted to insulate said bars from said coil, and a housing inclosing said frame, being curved so as to reflect the heat forwardly and downwardly therefrom.

7. An electric heater including a housing, an integrally formed base and side walls, said side walls being curved rearwardly and downwardly, a rear wall hingedly mounted on said base and conforming to the curvature of said side walls, a frame disposed within said housing, vertical supporting bars carried within said frame, rods supported by said frame, an insulating material sleeved on each of said rods, a resistance coil encircling each of said rods, loop-straps mounted on said vertical bars, adapted to hold said rods into engagement with said bars, said bars being provided with depressed portions adapted for the reception of an insulated strip for insulating said bars from said resistance coil, said frame being angularly disposed within said housing whereby to project a progressive heat therefrom.

In testimony whereof I affix my signature in presence of two witnesses.

FRANCIS F. LONG.

Witnesses:
  M. O'Shaughnessy,
  H. B. R. Dryden.